(12) United States Patent
Kim et al.

(10) Patent No.: US 11,701,941 B2
(45) Date of Patent: Jul. 18, 2023

(54) CASTER DEVICE, ROBOT HAVING THE SAME, AND METHOD FOR DRIVING ROBOT

(71) Applicant: SAMSUNG ELECTRONICS CO., LTD., Suwon-si (KR)

(72) Inventors: Jaehong Kim, Suwon-si (KR); Soonheum Ko, Suwon-si (KR); Youngdae Ko, Suwon-si (KR); Hyunsuk Kwak, Suwon-si (KR); Minhee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 16/892,946

(22) Filed: Jun. 4, 2020

(65) Prior Publication Data

US 2021/0061042 A1    Mar. 4, 2021

(30) Foreign Application Priority Data

Aug. 29, 2019  (KR) .................. 10-2019-0106904

(51) Int. Cl.
*B60B 33/00*     (2006.01)
*B60G 17/02*     (2006.01)

(52) U.S. Cl.
CPC .......... *B60G 17/02* (2013.01); *B60B 33/0049* (2013.01); *B60B 2900/551* (2013.01); *B60G 2202/00* (2013.01)

(58) Field of Classification Search
CPC ... Y10T 16/184; Y10T 16/216; Y10T 16/218; B60B 33/00; B60B 33/0042; B60B 33/0049; B60B 33/0015; B60B 33/0023; B60B 2900/551; B60B 7/00; B62B 5/02; B62B 5/021; B62B 5/026; B62B 5/023; B60G 17/02; B60G 2202/00
See application file for complete search history.

(56) References Cited

U.S. PATENT DOCUMENTS

| 2,426,664 | A | * | 9/1947 | Blazey | B60B 33/00 16/31 R |
| 2,810,925 | A | * | 10/1957 | Meyerhoefer | A47L 9/009 280/5.24 |
| 2,830,545 | A | * | 4/1958 | Robinson | B60B 33/00 16/21 |

(Continued)

FOREIGN PATENT DOCUMENTS

| DE | 202016105121 U1 | * | 1/2018 | ......... B60B 33/0039 |
| GB | 1370940 A | * | 10/1974 | ............. B60B 33/00 |

(Continued)

OTHER PUBLICATIONS

International Search Report (PCT/ISA/210) dated Sep. 15, 2020 issued by the International Searching Authority in International Application No. PCT/KR2020/007199.

(Continued)

*Primary Examiner* — Chuck Y Mah
(74) *Attorney, Agent, or Firm* — Sughrue Mion, PLLC

(57) ABSTRACT

A caster device includes a caster wheel configured to rotate around a horizontal rotation axis; and a case configured to expose a lower surface of the caster wheel, cover the caster wheel and have an inclined surface from a top of the horizontal rotation axis toward a bottom of the horizontal rotation axis.

11 Claims, 20 Drawing Sheets

(56) References Cited

U.S. PATENT DOCUMENTS

| | | | | |
|---|---|---|---|---|
| 3,184,783 | A | * | 5/1965 | Brigham ................. B60B 33/00 16/18 R |
| 3,239,872 | A | * | 3/1966 | Kitrell ....................... B62B 5/02 280/5.32 |
| 3,345,675 | A | * | 10/1967 | Haydock ................. B60B 33/00 16/45 |
| 5,134,753 | A | * | 8/1992 | Rekuc ...................... A45C 5/14 16/18 CG |
| 5,507,069 | A | | 4/1996 | Willis |
| 6,223,388 | B1 | * | 5/2001 | Sey .................... B60B 33/0002 16/46 |
| 6,332,240 | B1 | * | 12/2001 | Wu ..................... B60B 33/0049 16/18 CG |
| 6,728,991 | B2 | * | 5/2004 | Lai ..................... B60B 33/0028 16/35 R |
| 8,650,710 | B1 | * | 2/2014 | Waggener ............... B60B 33/02 16/35 R |
| 8,739,364 | B2 | * | 6/2014 | Fromm ................. B60B 33/063 16/42 R |
| 8,904,597 | B2 | * | 12/2014 | Long .................. B60B 33/0023 16/18 CG |
| 9,162,355 | B2 | | 10/2015 | Nakamura et al. |
| 9,474,427 | B2 | | 10/2016 | Lee et al. |
| 9,981,619 | B1 | * | 5/2018 | Deng ....................... B60R 19/00 |
| 11,338,616 | B1 | * | 5/2022 | Fitzhugh ................. B60B 7/0013 |
| 2002/0088083 | A1 | * | 7/2002 | Takizawa ................ B60B 7/061 16/45 |
| 2005/0165508 | A1 | | 7/2005 | Kanda et al. |
| 2006/0113733 | A1 | * | 6/2006 | Kazaoka .................. A61G 5/06 280/5.24 |
| 2007/0056140 | A1 | * | 3/2007 | Yamauchi ........... B60B 33/0021 16/18 B |
| 2011/0247903 | A1 | * | 10/2011 | Boukhny ................ B60B 33/00 188/68 |
| 2016/0213217 | A1 | | 7/2016 | Doughty |

FOREIGN PATENT DOCUMENTS

| | | | |
|---|---|---|---|
| JP | 10057419 | A * | 3/1998 |
| JP | 2002002206 | A * | 1/2002 |
| JP | 2005-25501 | A | 1/2005 |
| JP | 3696489 | B2 | 9/2005 |
| JP | 3171635 | U | 11/2011 |
| JP | 2014129036 | A * | 7/2014 |
| JP | 2016-143231 | A | 8/2016 |
| JP | 2016-224654 | A | 12/2016 |
| KR | 20100043802 | A * | 4/2010 |
| KR | 20110048375 | A * | 5/2011 |
| KR | 10-1216804 | B1 | 12/2012 |
| KR | 20-0475828 | Y1 | 1/2015 |
| KR | 10-2015-0109598 | A | 10/2015 |
| KR | 10-2016-0061235 | A | 5/2016 |
| KR | 10-2018-0080660 | A | 7/2018 |
| KR | 10-2018-0129179 | A | 12/2018 |
| KR | 10-2019-0003123 | A | 1/2019 |
| WO | WO-8200977 | A1 * | 4/1982 |
| WO | 2019/009729 | A2 | 1/2019 |

OTHER PUBLICATIONS

Written Opinion (PCT/ISA/237) dated Sep. 15, 2020 issued by the International Searching Authority in International Application No. PCT/KR2020/007199.

* cited by examiner

CASTER DEVICE, ROBOT HAVING THE SAME, AND METHOD FOR DRIVING ROBOT

CROSS-REFERENCE TO RELATED APPLICATION(S)

This application is based on and claims priority under 35 U.S.C § 119 to Korean Patent Application No. 10-2019-0106904, filed on Aug. 29, 2019, in the Korean Intellectual Property Office, the disclosure of which is incorporated by reference herein in its entirety.

BACKGROUND

1. Field

The disclosure relates to a caster device having improved drivability and balance retention, a robot having the same, and a method for driving a robot.

2. Description of Related Art

A robot can freely move in an indoor space using a driving wheel attached to the robot and a caster for maintaining a balance of the robot, and can perform various functions within the indoor space according to a specific function provided in the robot.

In some cases, the robot needs to cross an obstacle (for example, a threshold) existing within the indoor space, and a height of an obstacle that the robot is able cross may vary depending on a size (for example, a radius) of the caster. For example, the larger the size of the caster of the robot, the higher the height of the obstacle that the robot can cross.

However, the larger size of the caster provided in the robot might make a use of the robot cumbersome to a user.

SUMMARY

Provided are a caster device having improved drivability and balance retention, a robot having the same, and a method for driving a robot.

Additional aspects will be set forth in part in the description which follows and, in part, will be apparent from the description, or may be learned by practice of the presented embodiments.

In accordance with an aspect of the disclosure, a caster device may include: a caster wheel configured to rotate around a horizontal rotation axis; and a case configured to expose a lower surface of the caster wheel, cover the caster wheel and have an inclined surface from a top of the horizontal rotation axis toward a bottom of the horizontal rotation axis.

The inclined surface has a curvature greater than a curvature of the caster wheel.

The case includes an elastic member that is disposed on one surface of the case and is provided with the inclined surface.

The inclined surface is spaced apart from the caster wheel, and disposed between the horizontal rotation axis and the caster wheel.

The elastic member is made of at least one of elastomer, synthetic rubber, or natural rubber.

The case further includes a housing disposed inside the case, and a shock absorbing member disposed between the housing and the elastic member.

The shock absorbing member includes an elastic material including at least one of elastomer, urethane foam, or latex.

The shock absorbing member includes a spring that has one end connected to the housing and other end connected to the elastic member.

The caster device as claimed in claim 3, wherein the case includes an additional elastic member that is disposed on the other surface facing the one surface of the case and has an inclined surface from the top of the horizontal rotation axis toward the bottom of the horizontal rotation axis.

In accordance with an aspect of the disclosure, a robot includes: a main body; a driving wheel that is disposed at a lower portion of the main body and moves the main body; and a caster device that is disposed at the lower portion of the main body and is disposed in at least one side or the other side of the driving wheel, wherein the caster device includes: a caster wheel configured to rotate around a horizontal rotation axis, and a case configured to expose a lower surface of the caster wheel and have an inclined surface from a top of the horizontal rotation axis toward a bottom of the horizontal rotation axis.

The robot further includes a suspension disposed between the main body and the caster device and configured to adjust a height of the caster device.

A first distance from a lower surface of the main body to a center of gravity of the main body is greater than a second distance from the lower surface of the main body to the horizontal rotation axis of the caster wheel.

The robot further includes at least one of a positioning sensor, an inertial measurement unit sensor, or an inclination sensor.

In accordance with an aspect of the disclosure, a method for driving a robot includes: identifying an obstacle; identifying a height of the identified obstacle; determining a driving speed and a driving torque corresponding to the identified height; and driving the robot based on the determined driving speed and the determined driving torque.

The method further includes: determining whether the robot is capable of crossing the obstacle based on the identified height; and changing a moving path of the robot based on the determining that the robot is not capable of crossing the obstacle.

The method further includes: measuring an inclination of the robot in real time; and at least one of stopping the driving of the robot or changing a moving path of the robot, based on the measured inclination being equal to or greater than a preset value.

The method further includes: measuring an inclination of the robot in real time, and the driving further includes adjusting a height of a caster device of the robot so that the robot maintains a balance based on the measured inclination and continuing the driving of the robot.

BRIEF DESCRIPTION OF THE DRAWING

The above and other aspects, features, and advantages of certain embodiments of the present disclosure will be more apparent from the following description taken in conjunction with the accompanying drawings, in which.

DETAILED DESCRIPTION

Certain embodiments will be described below with reference to the accompanying drawings. However, this is not limiting and embodiments may be implemented in several forms and may be variously modified. In the accompanying drawings, sizes of components may be enlarged as compared with actual sizes for convenience of explanation, and ratios of the respective components may be exaggerated or reduced.

It is to be understood that when one component is referred to as being "connected to" or "coupled to" another component, it may be connected directly to or coupled directly to another component or be connected to or coupled to another component with the other component interposed therebetween. On the other hand, when a component is described as being "directly on" or "in direct contact with" another component, it can be understood that other components are not present therebetween. Other expressions describing the relationship between the components, for example, "between", "directly between", and the like can be interpreted similarly.

Terms used in the specification, 'first', 'second', etc., may be used to describe various components, but the components are not to be interpreted to be limited to the terms. These terms may be used to differentiate one component from other components. For example, a 'first' component may be named a 'second' component and the 'second' component may also be similarly named the 'first' component, without departing from the scope of the disclosure.

Singular forms are intended to include plural forms unless the context clearly indicates otherwise. It may be interpreted that terms "include", "have", or the like, means the presence of features, numerals, steps, operations, components, parts mentioned in the present specification, or a combination thereof, but do not preclude the addition of one or more other features, numerals, steps, operations, components, parts, or a combination thereof.

Terms used herein may be interpreted as the same meanings as meanings that are generally known to those skilled in the art unless defined otherwise.

Hereinafter, a structure of the robot 1 according to an embodiment will be described with reference to FIGS. 1 to 4. However, this is not limiting and an embodiment can be implemented in a different appliance, e.g., a vehicle.

Figure 1:
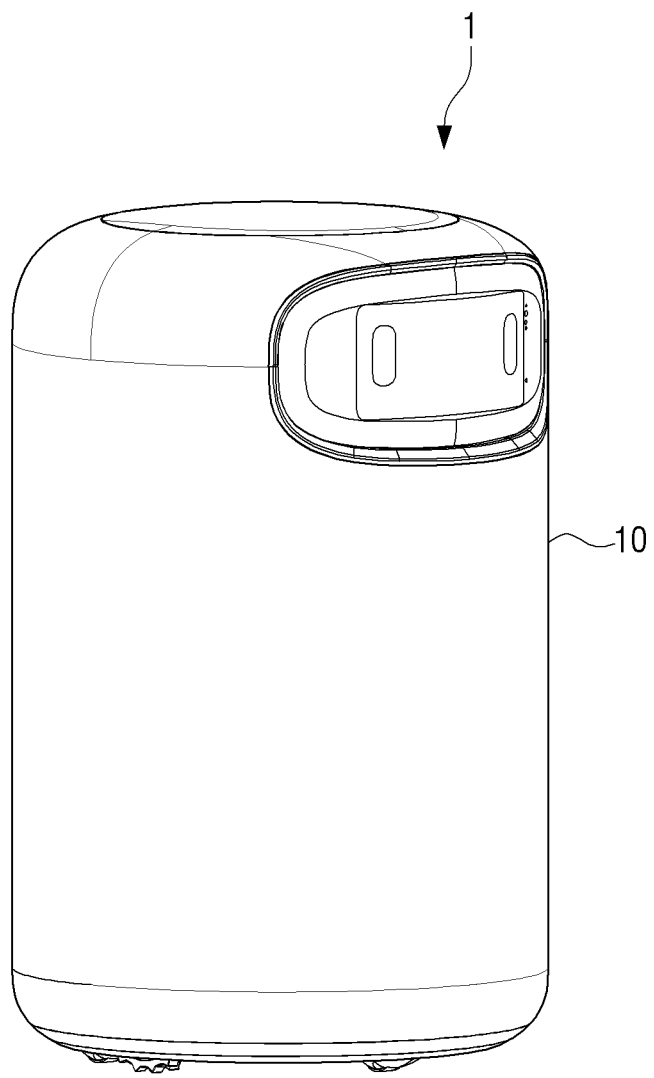
FIG. 1 is a perspective view of a robot according to an embodiment.
Figure 2:
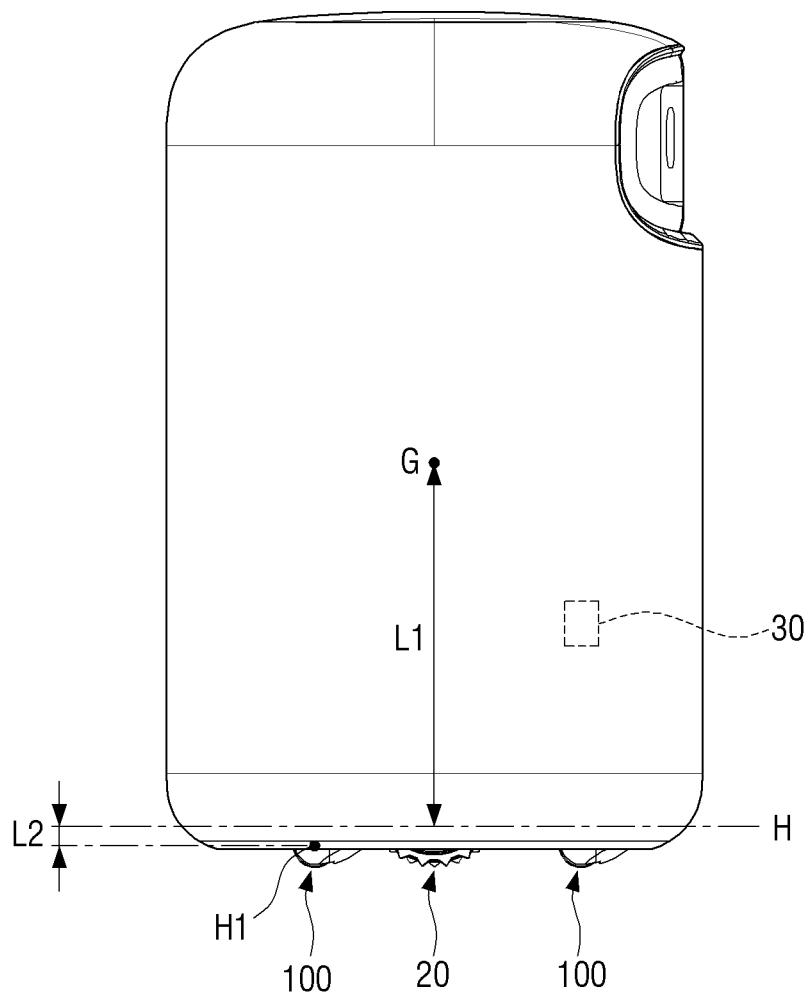
FIG. 2 is a side view of the robot according to an embodiment.
Figure 3:
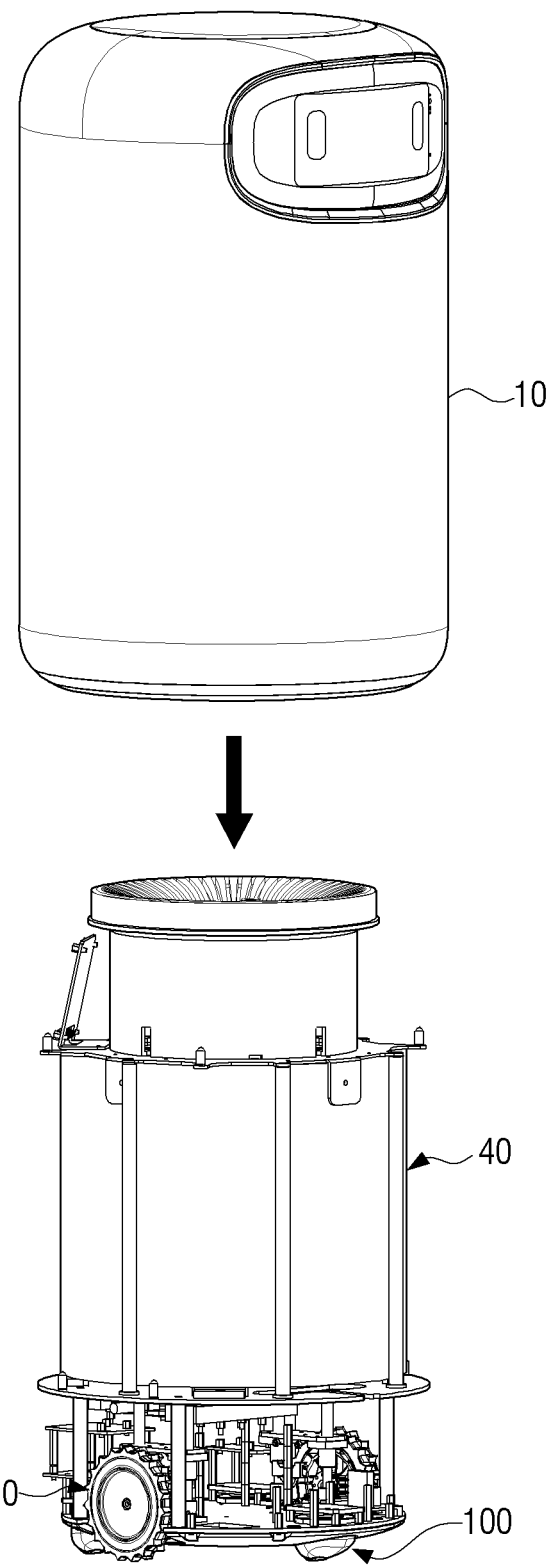
FIG. 3 is an exploded perspective view of the robot according to an embodiment.
Figure 4:
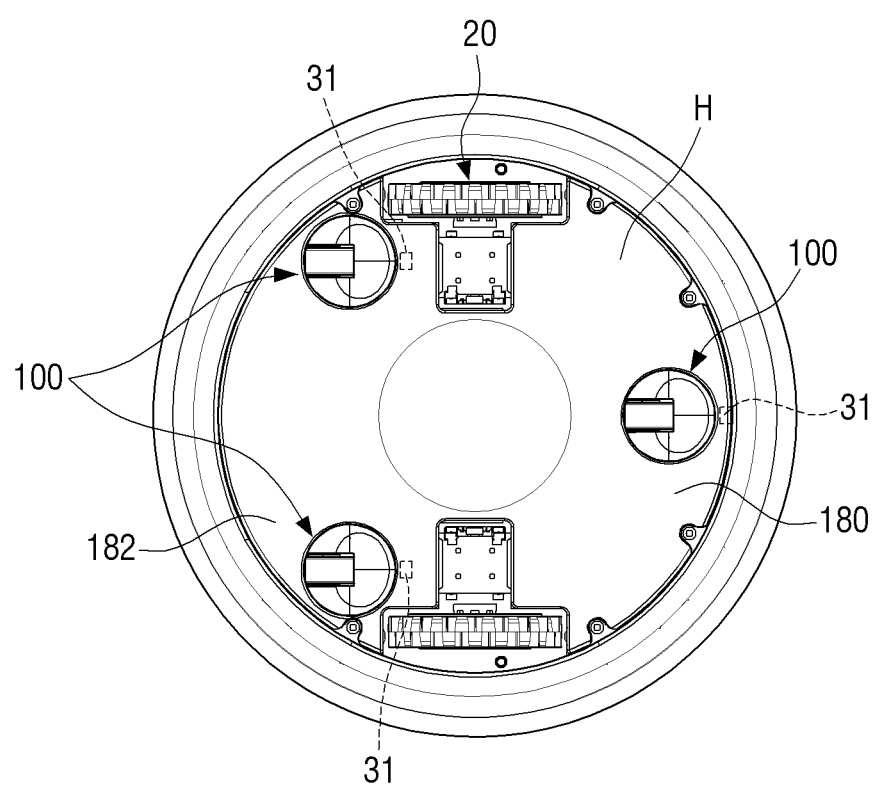
FIG. 4 is a bottom view of the robot according to an embodiment.

FIG. 1 is a perspective view illustrating the robot 1 according to an embodiment, FIG. 2 is a side view illustrating the robot 1 according to an embodiment, FIG. 3 is an exploded perspective view of the robot 1 according to an embodiment, and FIG. 4 is a bottom view illustrating the robot 1 according to an embodiment.

The robot 1 is a robot that moves in an indoor space, and may include a main body 10, one or more driving wheels 20 disposed beneath the main body 10 to move the main body 10, and one or more caster devices 100 disposed under the main body 10 and disposed in at least one of one side or the other side of the driving wheel 20, for example, a front side or a rear side with respect to a moving path of the robot 1.

Here, one side may mean a direction in which the robot 1 moves around the driving wheel 20, and the other side may mean a direction opposite to one side.

The main body 10 may form an outer shape of the robot 1 and have a predetermined height. Here, a preset height may vary depending on various devices disposed in the robot 1 according to the function of the robot 1.

For example, when an air purifying device 40 is disposed in the robot 1, a preset height of the main body 10 may be determined according to a size of a filter, a driving fan, and the like that are provided in the air purifying device 40. In addition, the main body 10 may have various shapes according to needs of a user.

Further, the robot 1 may perform various functions according to a type of devices disposed in the robot 1.

For example, when the air purifying device 40 is provided in the robot 1, the robot 1 can purify the air in the indoor space while freely moving within the indoor space. In addition, when a dust suction device is provided in the robot 1, the robot 1 can clean the inside of the indoor space while freely moving within the indoor space.

That is, the robot 1 is not limited to one function and can perform the corresponding function while freely moving within the indoor space according to the function provided in the robot 1.

Figure 6:
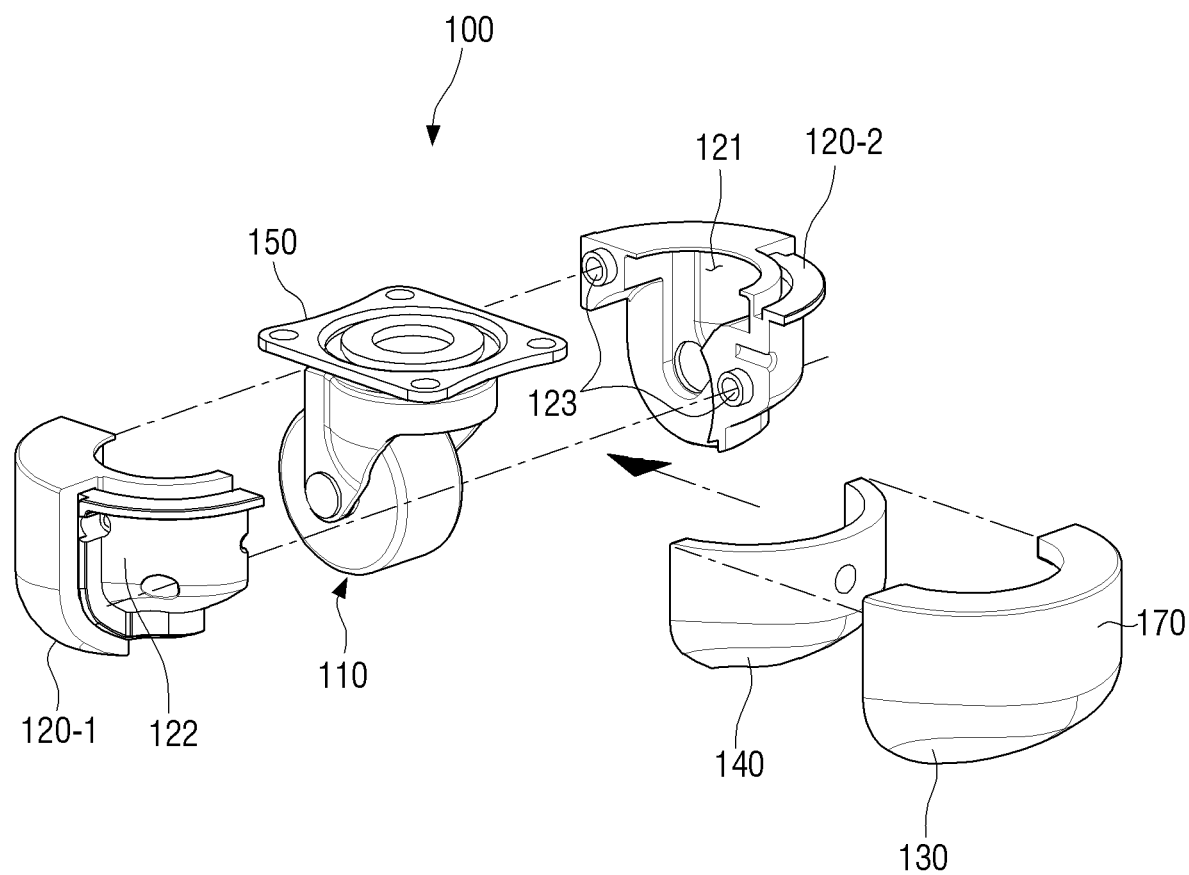
FIG. 6 is an exploded perspective view of the caster device according to an embodiment.

In addition, as illustrated in FIG. 2, the robot 1 may have a first distance L1 from a lower surface H of the main body 10 to a center of gravity G of the main body 10 greater than a second distance L2 from a lower surface H of the main body 10 to a horizontal rotation axis H1 of a caster wheel 110 shown in FIG. 6.

Here, the center of gravity G may mean center points of weights of various devices disposed inside the main body 10, and the center of gravity G may vary according to an arrangement of devices disposed inside the main body 10.

In addition, as the first distance L1 from the lower surface H of the main body 10 to the center of gravity G of the main body 10 is increased, a distance between the driving wheel 20 and the caster device 100 may be increased to maintain the balance of the main body 10.

The driving wheel 20 may be disposed under the main body 10 to provide a driving force for moving the main body 10.

For example, the driving wheel 20 may include a pair of wheels connected to one drive shaft. That is, the driving wheel 20 may be a differential wheel, and the robot 1 may operate as a differential wheeled robot.

Accordingly, the driving wheel 20 can freely change a direction of the robot 1 by changing a relative rotational speed of the pair of wheels. Therefore, an additional device for changing the direction of the robot 1 may not be required.

The size of the driving wheel 20 may vary, for example, in consideration of the aesthetic sense of the user.

In addition, the robot 1 may include a sensor 30 disposed at various locations inside the main body 10. For example, the sensor 30 may include various sensors such as a floor detection sensor 31, an inertial measurement unit sensor (IMU sensor), a positioning sensor, and an infrared sensor.

Therefore, the robot 1 can measure an inclination, an inertia, and a speed of the robot 1 by the sensor 30 and can identify an obstacle around the robot 1.

The caster device 100 is disposed under the main body 10 and maintains the balance of the main body 10 to prevent the robot 1 from falling over.

For example, when the driving wheel 20 is provided with a pair of wheels, it may be difficult to maintain the balance of the robot 1. Therefore, the caster device 100 is disposed on at least one of the front or rear sides of the driving wheel 20, thereby maintaining the balance of the robot 1 together with the driving wheel 20.

For example, as illustrated in FIG. 4, one caster device 100 may be disposed on the front side 180 of the driving wheel 20 and two caster devices 100 may be disposed on the rear side 182 of the driving wheel 20 based on a configuration of the driving wheels 20.

Hereinafter, the caster device 100 according to an embodiment will be described with reference to FIGS. 5 to 8.

Figure 5:
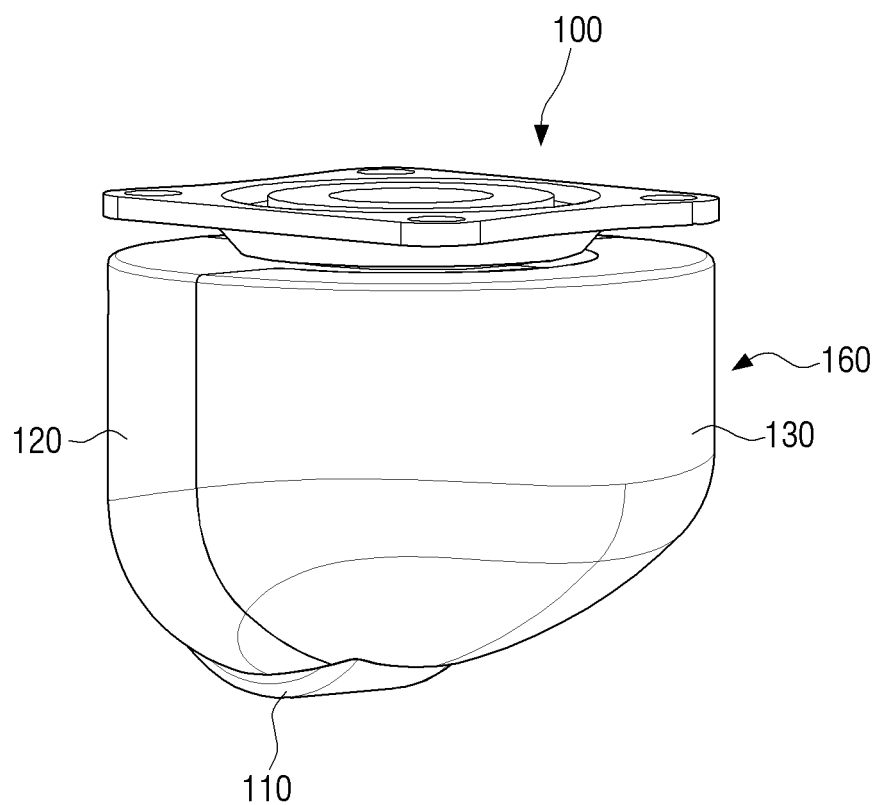
FIG. 5 is a perspective view of a caster device according to an embodiment.
Figure 7:
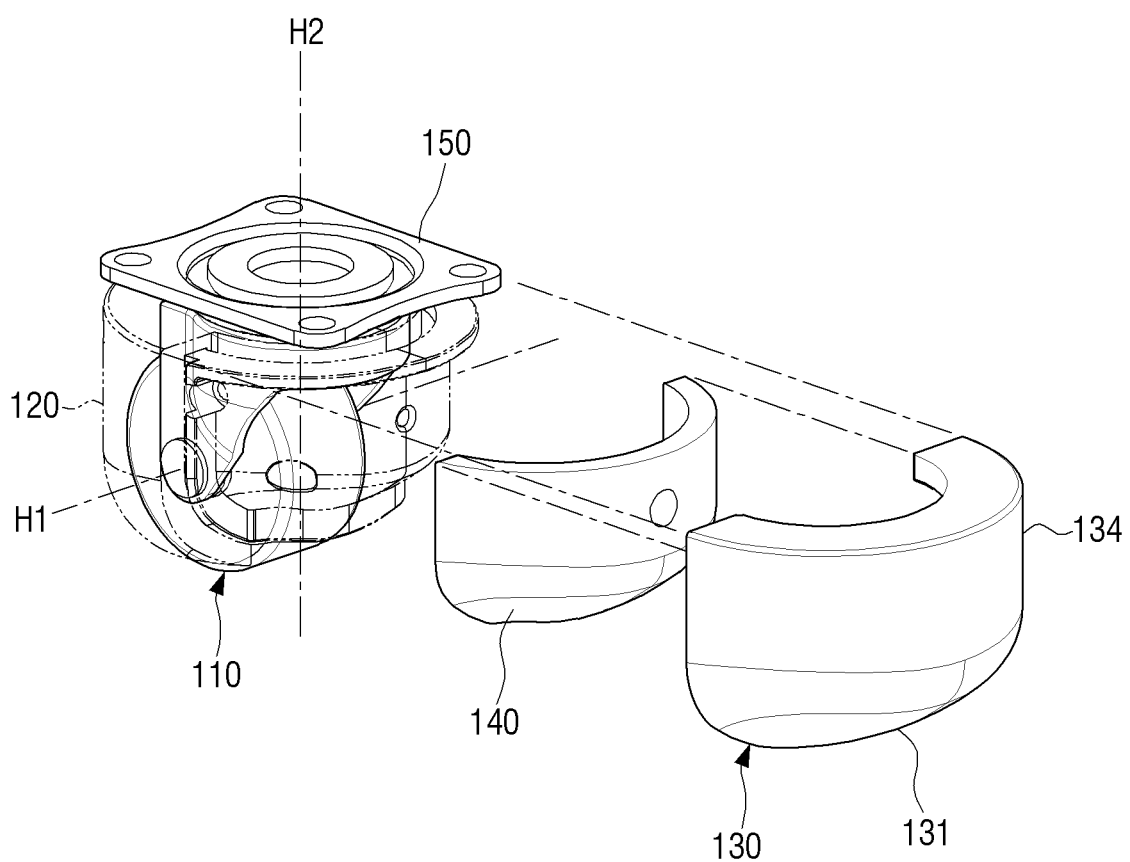
FIG. 7 is an exploded perspective view of a shock absorbing member and an elastic member in a state in which a case according to an embodiment is coupled.
Figure 8:
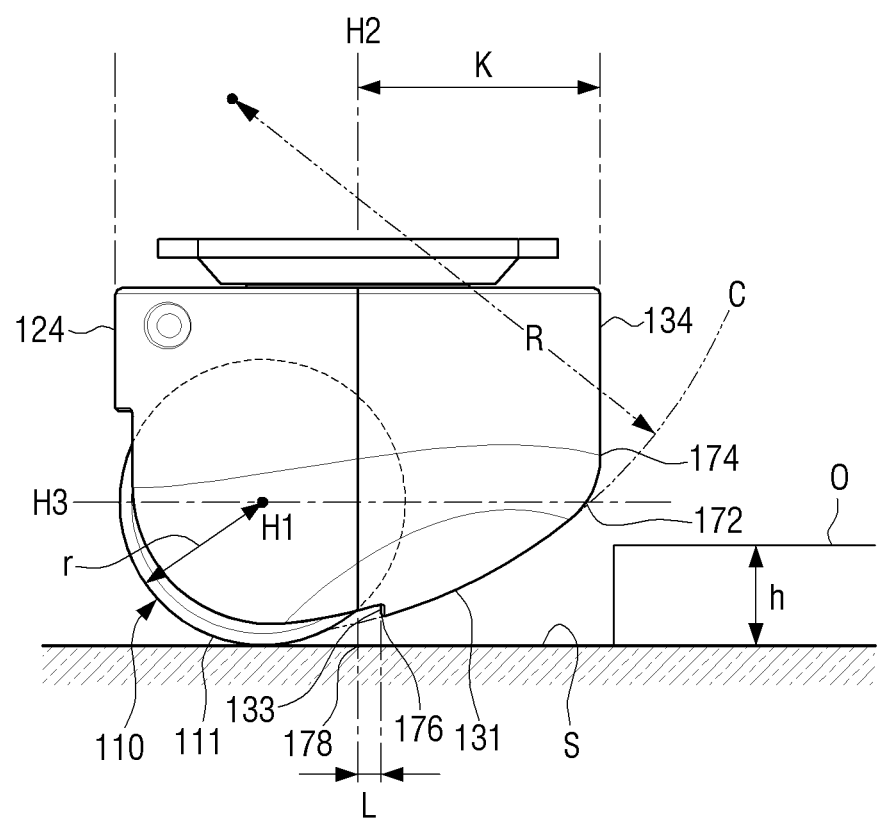
FIG. 8 is a side view of the caster device according to an embodiment.

FIG. 5 is a perspective view illustrating the caster device 100 according to an embodiment, FIG. 6 is an exploded perspective view illustrating the caster device 100 according to an embodiment, FIG. 7 is an exploded perspective view illustrating a shock absorbing member 140 and an elastic member 130 in a state in which a housing 120 according to an embodiment is coupled, and FIG. 8 is a side view of the caster device 100 according to an embodiment.

The caster device 100 is a device that is disposed under the main body 10 to maintain the balance of the robot 1, and may include a caster wheel 110 that rotates around the horizontal rotation axis H1, and a case 160 that exposes a lower surface of the caster wheel 110, covers the caster wheel 110, and has a first vertical surface 134 and an inclined surface 131 at an outer side surface 170 of the elastic member 130. An extended surface H3, i.e., an extended plane, includes the horizontal rotation axis H1 and intersects the inclined surface 131 at a point 172. The inclined surface 131 extends from a point 174, which is located on the outer side surface 170 higher than the point 172 with respect to the horizontal rotation axis H1, toward an edge 176 at a bottom of the outer side surface 170 that is located adjacent to a point 178 where a vertical rotation axis H2 intersects a bottom surface S, e.g., a horizontal surface such as, for example, a ground or a floor.

In addition, the case 160 may include the housing 120 which is disposed to expose a lower surface of the caster wheel 110 and cover the caster wheel 110, the elastic member 130 that includes the inclined surface 131 inclined in a direction in which the caster wheel 110 is disposed, and the shock absorbing member 140 that is disposed between the housing 120 and the elastic member 130.

The caster wheel 110 is a wheel that rotates around the horizontal rotation axis H1, and may have a preset wheel radius r. Here, referring to FIG. 8, the wheel radius r may be determined in consideration of a rotation radius K of the caster wheel 110 with respect to a vertical rotation axis H2.

For example, as the wheel radius r is increased, the rotation radius K becomes much greater due to a distance between the horizontal rotation axis H1 and the vertical rotation axis H2, which may impair the aesthetic appearance of the robot 1.

Accordingly, the wheel radius r may be formed small in consideration of the aesthetic sense of the user with respect to the robot 1. In addition, the wheel radius r of the caster wheel 110 may be smaller than the radius of the driving wheel 20.

The housing 120 is disposed to surround the caster wheel 110, thereby protecting the caster wheel 110 from the outside and at the same time covering the caster wheel 110 to improve the aesthetic sense of the user.

The housing 120 may be constituted by a pair of members. For example, the housing 120 may cover the caster wheel 110 by coupling a first housing 120-1 and a second housing 120-2.

In addition, the housing 120 may include an insertion groove 121 into which the caster wheel 110 is inserted and that has a shape corresponding to an outer shape of the caster wheel 110, a coupling surface 122 on which the shock absorbing member 140 and the elastic member 130 are disposed, and a coupling portion 123 that couples the first housing 120-1 and the second housing 120-2.

The insertion groove 121 may be formed in the first housing 120-1 and the second housing 120-2, respectively, and the caster wheel 110 may be disposed within the insertion groove 121 when the first housing 120-1 and the second housing 120-2 are coupled.

The coupling surface 122 may be formed on the front surface of the housing 120, and may be seated with the shock absorbing member 140 and the elastic member 130. For example, the coupling surface 122 may be a shape corresponding to the shape of the shock absorbing member 140, and an outer circumferential surface of the coupling surface 122 may be coupled with the elastic member 130.

The coupling portion 123 is for fixing the coupled state of the first housing 120-1 and the second housing 120-2, and may be formed in the first housing 120-1 and the second housing 120-2, respectively.

Therefore, the first housing 120-1 and the second housing 120-2 are disposed on the opposing sides of the caster wheel 110 and coupled, and the first housing 120-1 and the second housing 120-2 may be fixed to each other through the coupling portion 123. The coupling portion 123 may be fixed by a fixing device such as a screw, etc., and may include its own coupling configuration such as snap coupling.

In addition, the housing 120 may include a second vertical surface 124 having a constant radius from the vertical rotation axis H2. Here, the constant radius may correspond to the rotation radius K of the caster device 100 from the vertical rotation axis H2.

In addition, the second vertical surface 124 of the housing 120 may be coupled with a first vertical surface 134 of the elastic member 130 to form the rotation radius K of the caster device 100.

That is, the second vertical surface 124 may be parallel to the vertical rotation axis H2 and may be formed to be spaced apart from the vertical rotation axis H2 by a predetermined distance.

In addition, the housing 120 may be injection molded. In addition, the housing 120 may be made of a plastic material. Therefore, the housing 120 may have a predetermined hardness and a relatively high strength, thereby protecting the caster wheel 110 from an external shock.

The elastic member 130 may be disposed on the front surface of the housing 120 to guide the caster device 100 so that an obstacle O that the caster device 100 crosses can come into contact with the caster wheel 110. In addition, the elastic member 130 may be disposed on one surface of the case 160 and the inclined surface 131 may be formed.

Specifically, the elastic member 130 may include the inclined surface 131 that may guide the obstacle O contacting the caster device 100 to a lower surface 111 of the caster wheel 110 and a first vertical surface 134 that extends from the inclined surface 131 and has a constant radius from the vertical rotation axis H2.

As illustrated in FIG. 8, the inclined surface 131 may be disposed in a lower region of the elastic member 130 and may be formed to be inclined in a direction toward the caster wheel 110.

For example, the inclined surface 131 may be disposed on an extended surface H3 including the horizontal rotation axis H1. Specifically, the inclined surface 131 may be formed to decrease inclination with respect to a bottom surface S toward the bottom from an adjacent portion on the extended surface H3.

In addition, the inclined surface 131 may be spaced apart from the caster wheel 110 and may be disposed between the horizontal rotation axis H1 and the caster wheel 110.

In addition, an extension line C from the inclined surface 131 to the lower surface 111 of the caster wheel 110 may have a constant curvature. That is, a part of the caster wheel 110 and the inclined surface 131 of the elastic member 130 may be disposed on a constant curvature.

In addition, the inclined surface 131 may have a curvature greater than that of the caster wheel 110.

Accordingly, when the caster device 100 crosses the obstacle O, the obstacle O may move along the inclined surface 131 of the elastic member 130, and may naturally come into contact with the caster wheel 110 disposed on the extension line C having the same curvature as the inclined surface 131.

Therefore, even when the robot 1 crosses the obstacle O, the elastic member 130 may smoothly cross the obstacle O of the robot 1 by guiding the natural contact between the obstacle O and the caster wheel 110 while alleviating the shock with the obstacle O.

That is, the shaking of the center of gravity G can be minimized by minimizing the shaking when the robot 1 crosses the obstacle O, and as a result, the driving of the robot 1 can be implemented as a stable balance of the robot 1.

In addition, the inclined surface 131 of the elastic member 130 has a virtual radius R forming a constant curvature, and as a result, a height h of the obstacle O that the caster device 100 can stably cross may be increased.

For example, considering that the greater the wheel radius r of the caster wheel 110, the higher the height of the obstacle O that the caster device 100 can cross, when the caster device does not include the housing 120 and the elastic member 130 according to an embodiment, the caster device may cross only an obstacle of a height corresponding to the wheel radius r.

However, in the caster device 100 provided with the housing 120 and the elastic member 130 according to an embodiment, the inclined surface 131 of the elastic member 130 serves as the virtual radius R, and therefore, the height of the obstacle O that the caster device 100 may cross may be increased.

Therefore, by increasing the height of the obstacle O that the robot 1 can cross, a moving region of the robot 1 can be widened and the drivability of the robot 1 can be improved.

In addition, considering that the first distance L1 of the robot 1 according to an embodiment is greater than the second distance L2, and therefore, the robot 1 falls even with a small shock due to the center of gravity G located at the top, when the robot 1 passes through the obstacle O, the radius of movement of the center of gravity G from the lower surface H may be minimized to prevent the robot 1 from falling in one direction.

In addition, because the wheel radius r of the caster wheel 110 may be small, the rotation radius K of the caster device 100 may be greatly reduced, and the size of the caster device 100 of the robot 1 may be reduced.

Accordingly, by making the caster device 100 of the robot 1 small, the aesthetic appearance of the robot 1 can also be improved.

The first vertical surface 134 may have a constant radius from the vertical rotation axis H2. Here, the constant radius may correspond to the rotation radius K of the caster device 100 from the vertical rotation axis H2.

In addition, the first vertical surface 134 of the elastic member 130 may be coupled with the second vertical surface 124 of the housing 120 to form the rotation radius K of the caster device 100.

That is, the first vertical surface 134 may be parallel to the vertical rotation axis H2 and may be formed to be spaced apart from the vertical rotation axis H2.

In addition, the elastic member 130 may be made of an elastic material. For example, the elastic member 130 may be made of at least one of elastomer, synthetic rubber, or natural rubber. However, the elastic member 130 may also be made of a composite of the above materials, and may be made of various materials having elasticity.

Accordingly, the elastic member 130 may absorb the shock applied to the robot 1 when the robot 1 comes into contact with the obstacle O and crosses the obstacle O. Therefore, it is possible to reduce the shaking of the robot 1 and implement the balanced driving of the robot 1.

In addition, the elastic member 130 may include a step 133 that is formed in the direction in which the caster wheel 110 is disposed from the inclined surface 131 and is disposed to be spaced apart from the caster wheel 110 by a predetermined distance. In addition, the step 133 may form a space that is spaced apart from the caster wheel 110.

Accordingly, even if a foreign material enters between the steps 133, it is possible to prevent the rotation of the caster wheel 110 through the space formed between the step 133 and the caster wheel 110. In addition, when the robot 1 crosses the obstacle O, the step 133 and a predetermined distance between the caster wheel 110 and the elastic member 130 may minimize the shock transmitted to the robot 1.

The shock absorbing member 140 may be disposed between the case 160 and the elastic member 130. Specifically, the shock absorbing member 140 may be disposed between the housing 120 and the elastic member 130, and may additionally absorb the shock applied to the elastic member 130 due to the contact with the obstacle O.

The shock absorbing member 140 may be disposed on the coupling surface 122 of the housing 120, and may be fixed by the elastic member 130 and the housing 120.

The shock absorbing member 140 may be made of a material capable of absorbing shock. For example, the shock absorbing member 140 may be made of various materials capable of alleviating the shock, such as foam, elastomer, urethane foam, and latex.

In addition, the caster device 100 includes a fixing member 150 connected to the caster wheel 110 so that the caster wheel 110 can rotate 360° around the vertical rotation axis H2 perpendicular to the horizontal rotation axis H1.

The fixing member 150 may connect the caster device 100 to the main body 10, and may be a reference axis for 360° rotation of the caster wheel 110. Accordingly, when the robot 1 rotates by the driving wheel 20, the caster device 100 may also rotate to maintain the balance of the robot 1.

Hereinafter, the operation of the caster device 100 and the method for driving the robot 1 according to an embodiment will be described with reference to FIGS. 9 to 15.

Figure 9:
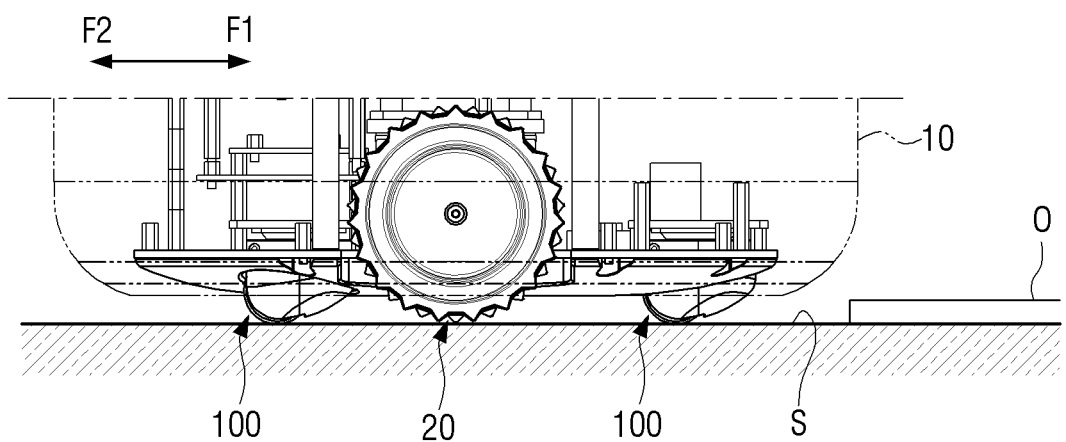
FIG. 9 is a side view of the robot according to an embodiment.
Figure 10A:
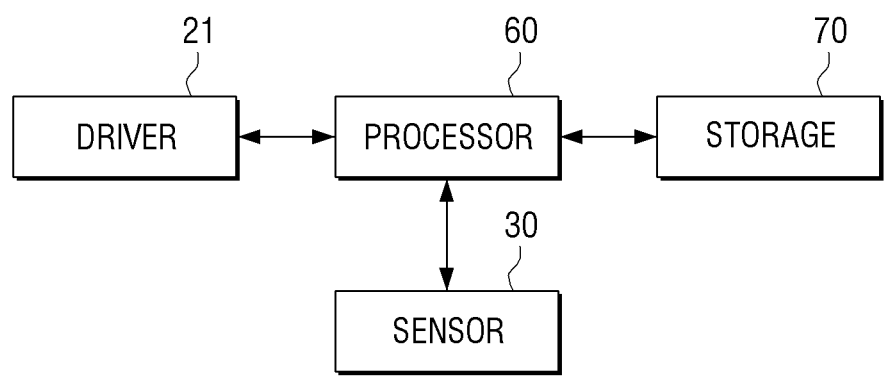
FIG. 10A is a block diagram illustrating a portion of a robot according to an embodiment.
Figure 10B:
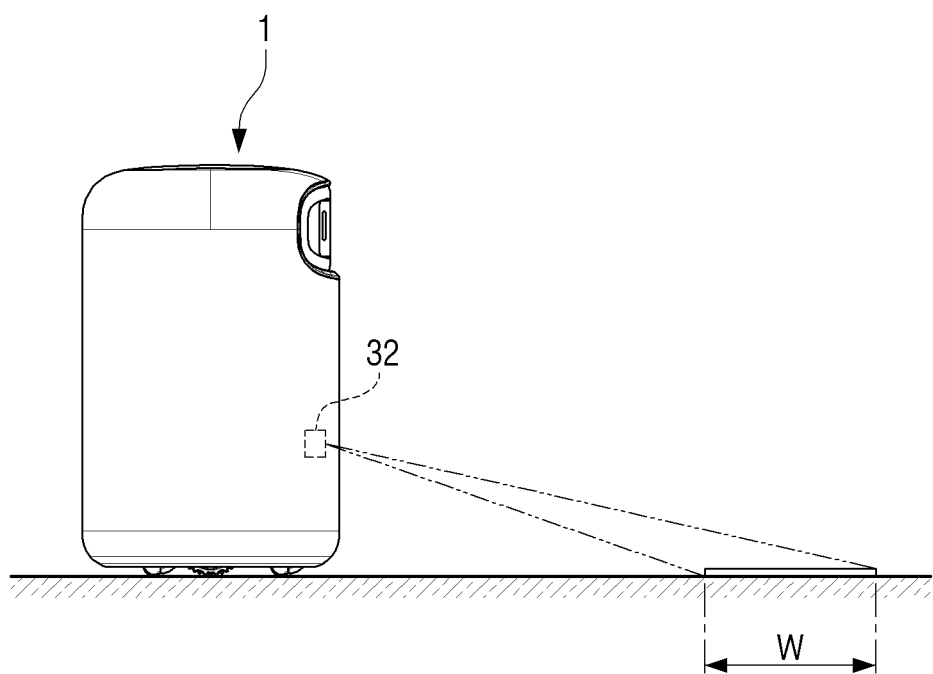
FIG. 10B is a schematic diagram illustrating a robot according to an embodiment.
Figure 11:
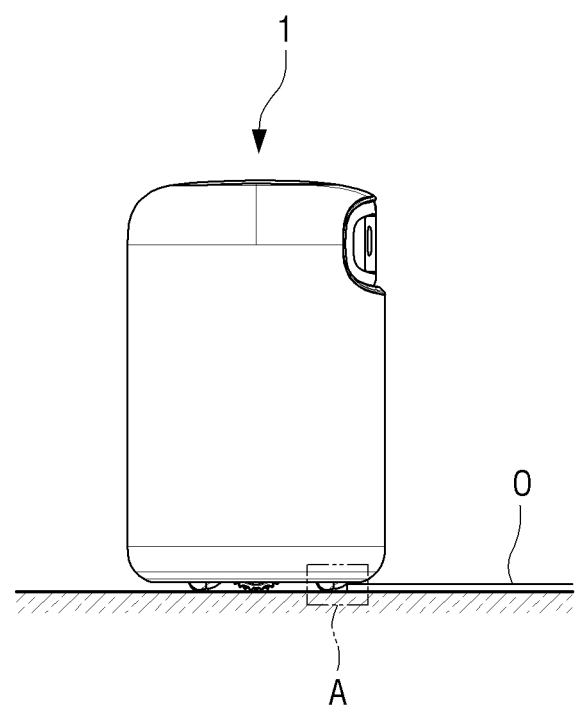
FIG. 11 is a schematic diagram illustrating a state in which the robot according to an embodiment comes into contact with an obstacle.
Figure 12A:
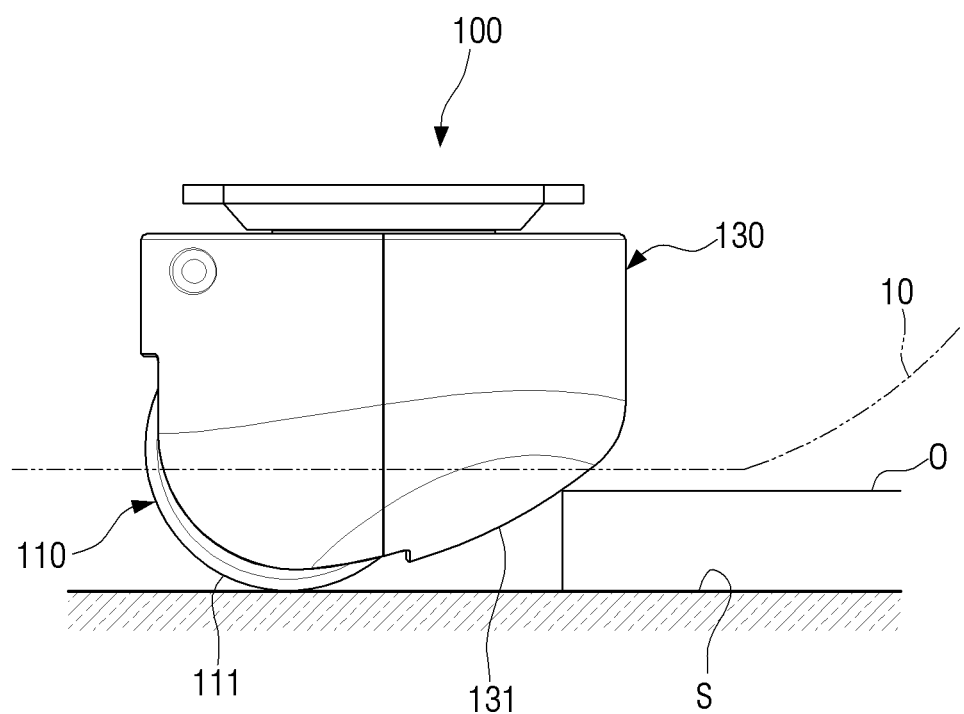
FIG. 12A is an enlarged view illustrating region A of FIG. 11.
Figure 12B:
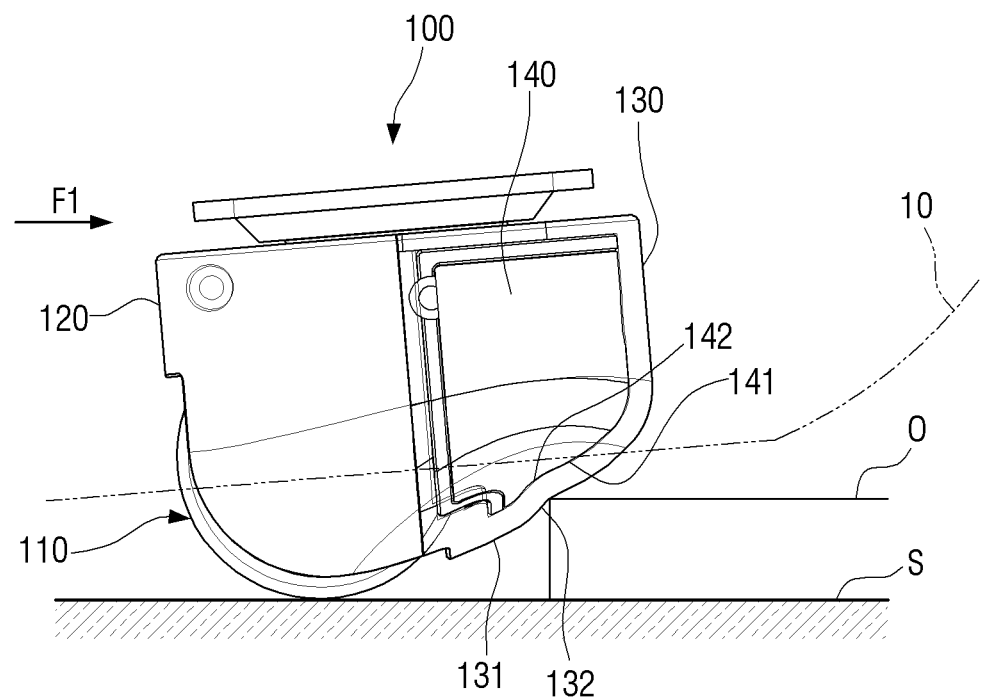
FIG. 12B is a schematic diagram illustrating an intermediate state in which the robot according to an embodiment crosses an obstacle.
Figure 12C:
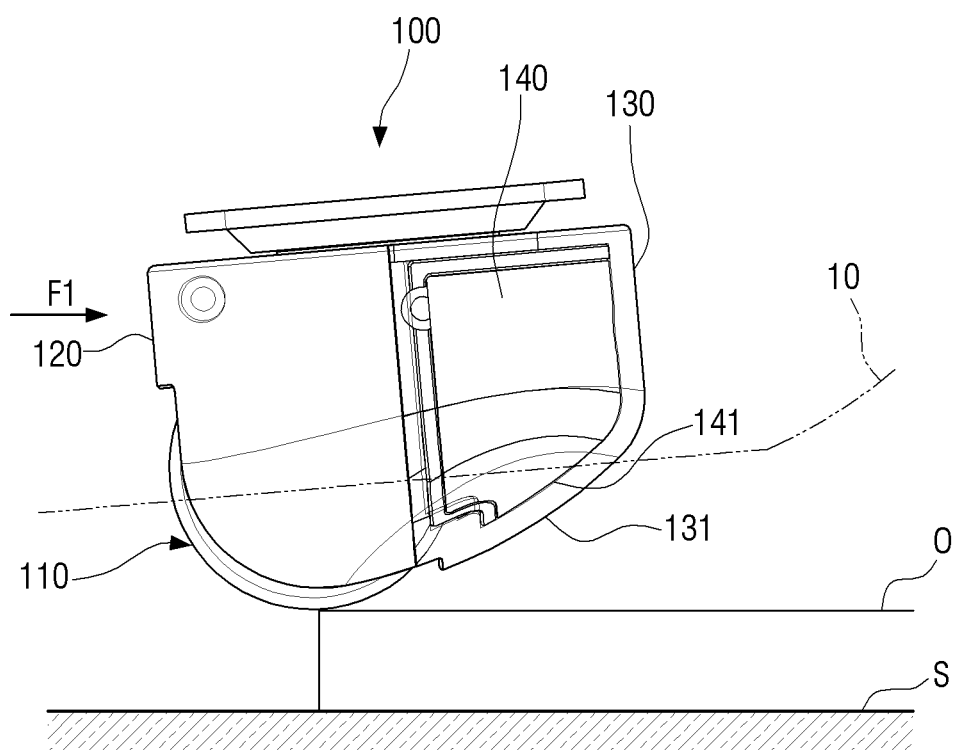
FIG. 12C is a schematic diagram illustrating a state in which a front caster device according to an embodiment is located on an obstacle.
Figure 13:
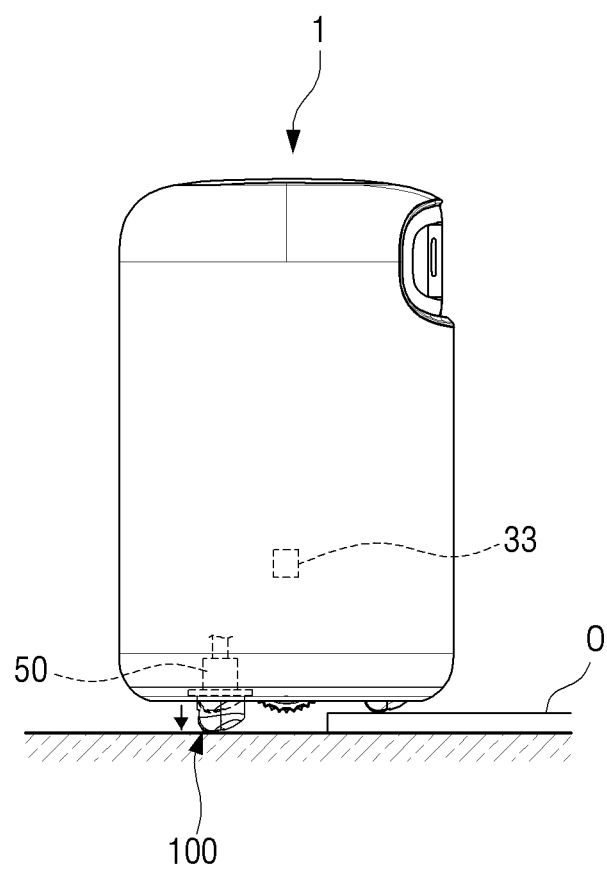
FIG. 13 is a schematic diagram illustrating a suspension according to an embodiment.
Figure 14:
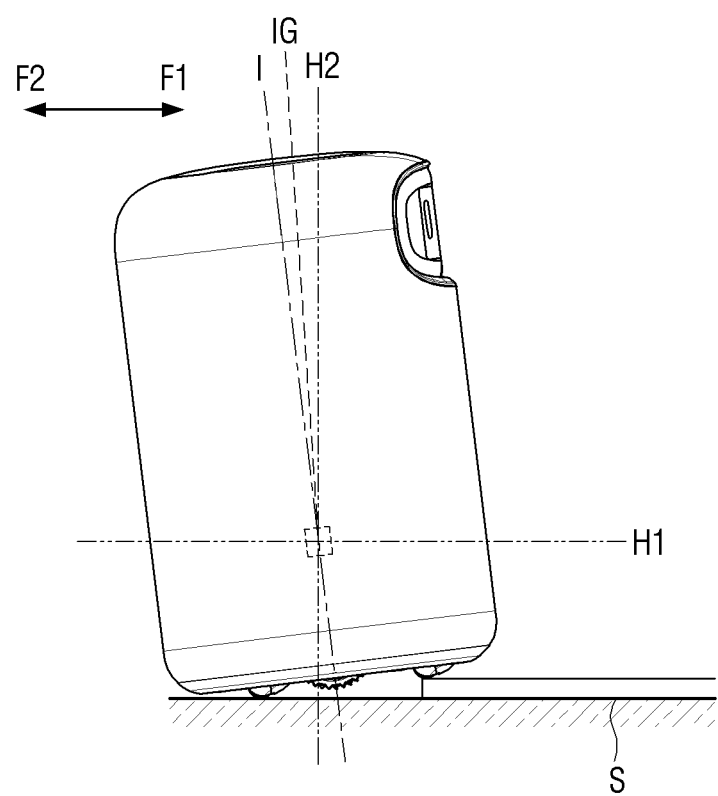
FIG. 14 is a schematic diagram illustrating a state in which the front caster device according to an embodiment is located on the obstacle.
Figure 15:
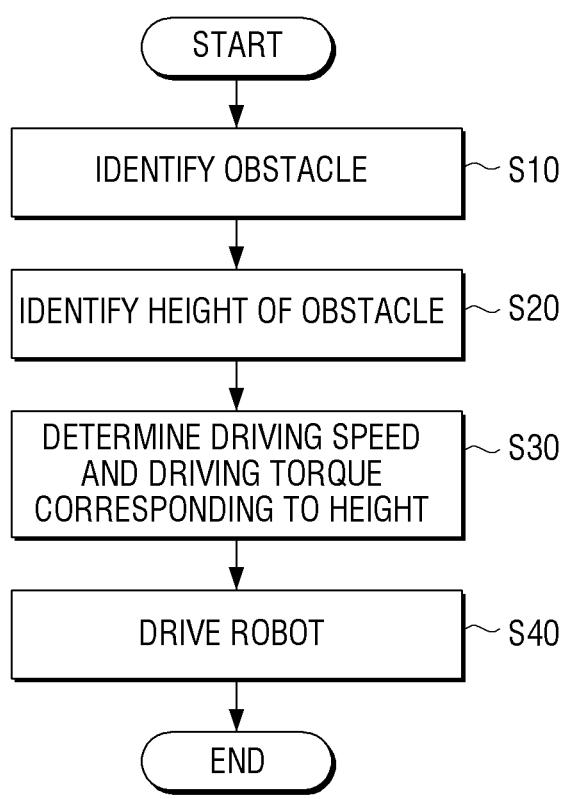
FIG. 15 is a flowchart illustrating a method for driving a robot according to an embodiment.

FIG. 9 is a part of a side view of the robot 1 according to an embodiment, FIG. 10A is a block diagram illustrating a processor 60, a storage 70, a sensor 30, and a driver 21 according to an embodiment, FIG. 10B is a schematic diagram illustrating that the robot 1 according to an embodiment identifies the obstacle O, FIG. 11 is a schematic diagram illustrating a state in which the robot 1 according to an embodiment comes into contact with the obstacle O, FIG. 12A is an enlarged view illustrating region A of FIG. 11, FIG. 12B is a schematic diagram illustrating an intermediate state in which the robot 1 according to an embodiment crosses the obstacle O, FIG. 12C is a schematic diagram illustrating a state in which the front caster device 100 according to an embodiment is located on the obstacle O, FIG. 13 is a schematic view illustrating a state in which a suspension 50 according to an embodiment operates, FIG. 14 is a schematic diagram illustrating a state in which the front caster device 100 according to an embodiment is located on the obstacle O, and FIG. 15 is a flowchart illustrating a method for driving a robot according to an embodiment.

First, as illustrated in FIG. 10B, the robot 1 may identify the obstacle O by the sensor 32 while moving (Operation S10 of FIG. 15). Here, the sensor 32 may be an obstacle recognition sensor. For example, the sensor 32 may be a 3D-IR stereo sensor or an IR line projector sensor.

Accordingly, the processor 60 may check a height h and a width w of the obstacle O identified by the sensor 32 (Operation S20 of FIG. 15).

Here, the processor 60 is embedded in the robot 1, and can control the overall operation of the robot 1. In addition, the processor 60 may include one or more of a central processing unit (CPU), a controller, an application processor (AP), a communication processor (CP), or an ARM processor.

Next, the processor 60 may determine a driving speed and a driving torque corresponding to the identified height h (Operation S30 of FIG. 15). For example, the driving speed and driving torque optimized for the driving wheel 20 corresponding to the height of the obstacle O are stored in the storage 70.

In addition, the processor 60 is connected to the driver 21 that controls the operation of the driving wheel 20, the storage 70, and the sensor 30 to control the driver 21, the storage 70, and the sensor 30. In addition, the processor 60 may exchange control signals and information through signal transmission between the driver 21, the storage 70, and the sensor 30.

Here, the storage 70 is embedded in the main body 10 and may be constituted by a memory. Specifically, the storage 70 may be implemented as a flash memory type, a ROM, a RAM, a hard disk type, a multimedia card micro type, a card type memory (for example, SD or XD memory, and the like). In addition, the storage 70 is electrically connected to the processor 60 to transmit signals and information to the processor 60.

A driving speed v1 and a driving torque t1 optimized for the robot 1 corresponding to a first height h1 may be stored in the storage 70, and a driving speed v2 and a driving torque t2 optimized for the robot 1 corresponding to a second height h2 may be stored in the storage 70. However, this is not limiting, and a number of driving speeds and driving torques that are optimized for the robot 1 corresponding to various heights may be predetermined and stored.

Accordingly, the processor 60 may determine the driving speed and the driving torque stored in the storage 70 corresponding to the height of the obstacle O identified by the sensor 32, and drive the driving wheel 20 of the robot 1 according to the optimized driving speed and driving torque (Operation S40 of FIG. 15).

Therefore, considering the specifications of the robot 1 and the height of the obstacle O, the robot 1 can be driven stably.

In addition, as illustrated in FIG. 11, the processor 60 may move the robot 1 in a first direction F1 in which the obstacle O is located according to the determined driving speed and driving torque.

Thereafter, the robot 1 may come into contact with the obstacle O. For example, as illustrated in FIG. 12A, the inclined surface 131 of the elastic member 130 may come into contact with the obstacle O.

On the other hand, the processor 60 may determine whether the robot 1 can cross the obstacle O based on the identified height h. In addition, the processor 60 may change a moving path of the robot 1 when it is determined that the robot 1 cannot cross the obstacle O.

For example, the processor 60 may move the robot 1 in a second direction F2, which is a direction away from the obstacle O. Therefore, it is possible to prevent the robot 1 from falling over the obstacle O.

Next, as the processor 60 continuously moves the robot 1 in the first direction F1, the inclined surface 131 of the elastic member 130 interferes with the obstacle O, and thus the robot 1 may move along the inclined surface 131.

Here, since the elastic member 130 and the shock absorbing member 140 are made of an elastic material, a first shock absorbing portion 132 and a second shock absorbing portion 142 may be formed according to the contact and shock due to the obstacle O.

In addition, the second shock absorbing portion 142 may be formed due to the contact of the obstacle O on the inclined surface 131, and may be formed by the shock of the obstacle O and the caster device 100. In addition, the first shock absorbing portion 132 may be formed in a contact portion with the obstacle O.

In addition, the second shock absorbing portion 142 may be formed on a shock absorbing surface 141 of the shock absorbing member 140 in a position corresponding to the formed portion of the first shock absorbing portion 132. In addition, the second shock absorbing portion 142 may be formed by the shock of the obstacle O and the caster device 100, and additionally absorb the shock with the obstacle O.

Thereafter, as illustrated in FIG. 12C, as the processor 60 continuously moves the robot 1 in the first direction F1, the obstacle O contacting the inclined surface 131 may come into contact with the caster wheel 110 that is located on the extension line having the same curvature as the inclined surface 131.

Therefore, the caster device 100 includes the elastic member 130 and the shock absorbing member 140, so the height of the obstacle O that the robot 1 can cross even with the relatively small wheel radius r of the caster wheel 110 can be increased and the aesthetic sense of the caster device 100 can be improved through the small wheel radius r. In addition, by absorbing the shock between the robot 1 and the obstacle O and smoothly guiding the obstacle O to the caster wheel 110, the shaking of the robot 1 can be greatly reduced.

In addition, as illustrated in FIG. 13, while the robot 1 crosses the obstacle O, the processor 60 may measure the inclination of the robot 1 by the floor detection sensor 31 or the IMU sensor 33.

Accordingly, the processor 60 may adjust the height of the caster device 100 with respect to the main body 10 so that the robot 1 maintains the balance, based on the inclination of the robot 1 measured in real time.

For example, when the front caster device 100 is disposed at an elevated position on the obstacle O, the robot 1 may be inclined in one direction, but the suspension 50 included in the rear caster device 100 is adjusted to adjust the height of the rear caster device 100 with respect to the main body 10.

Therefore, the robot 1 can maintain a balance so that the robot 1 does not fall in one direction even while crossing the obstacle O.

Here, the suspension 50 may be disposed between the main body 10 and the caster device 100 to adjust the height of the caster device 100 with respect to the main body 10. For example, the suspension 50 may be an auto suspension.

Next, as illustrated in FIG. 14, while the robot 1 crosses the obstacle O, the processor 60 may measure the inclination of the robot 1 in real time, e.g., by the floor detection sensor 31 and/or the IMU sensor 33.

Thereafter, the processor 60 may determine whether the measured inclination I is equal to or greater than a preset inclination value IG. Next, the processor 60 may stop the driving of the robot 1 and/or change the moving path of the robot 1 when the measured inclination I is equal to or greater than the preset inclination value IG.

For example, when the robot 1 is inclined more than a threshold value in the process of crossing the obstacle O, the processor 60 may control the robot 1 to move in the second direction F2 to make the robot descend the obstacle O.

Accordingly, the robot 1 may be prevented from falling in real time, e.g., due to an error in the height h that was measured, while crossing the obstacle O, thereby realizing the stable driving of the robot 1.

In addition, next, the processor 60 may control the robot 1 to cross the obstacle by continuously advancing the robot 1 in the first direction F1 if the measured inclination I is less than the preset value IG.

Hereinafter, a structure of a caster device 100 according to an embodiment will be described with reference to FIG. 16.

Figure 16:
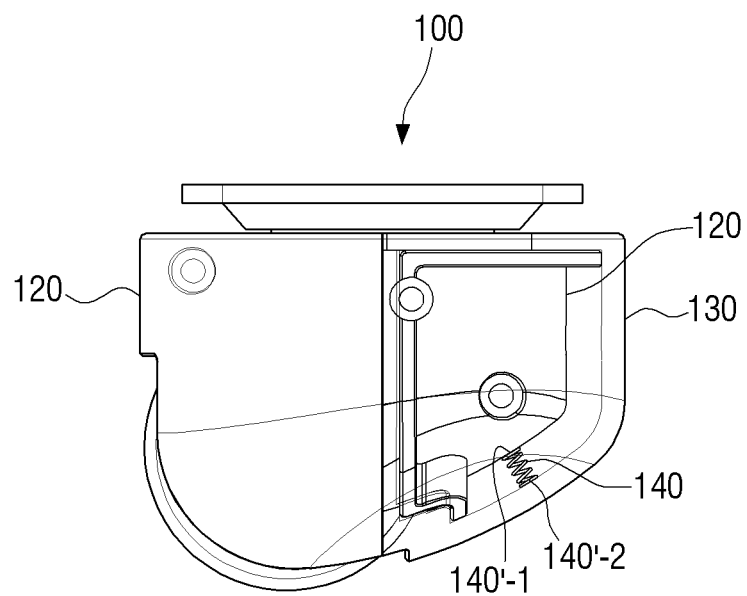
FIG. 16 is a side view of the caster device according to an embodiment.

FIG. 16 is a side view of the caster device 100 according to an embodiment. Here, the same reference numbers are used for the same configuration, and repeated description thereof will be omitted.

For example, since the housing 120 and the elastic member 130 are the same as described above, repeated description thereof will be omitted.

A shock absorbing member 140 may be a spring that has one end 140'-1 connected to the housing 120 and the other end 140'-2 connected to the elastic member 130. However, the shock absorbing member 140 is not limited to being constituted by a single spring and may be constituted by a plurality of springs.

Accordingly, the shock absorbing member 140 may directly absorb the amount of shock occurring due to the contact with the obstacle O through the spring.

When the shock absorbing member 140 is constituted by a spring, by constructing semi-permanent durability, structural stability of the caster device 100 may be improved.

Hereinafter, a structure of a caster device 100 according to an embodiment will be described with reference to FIG. 17.

Figure 17:
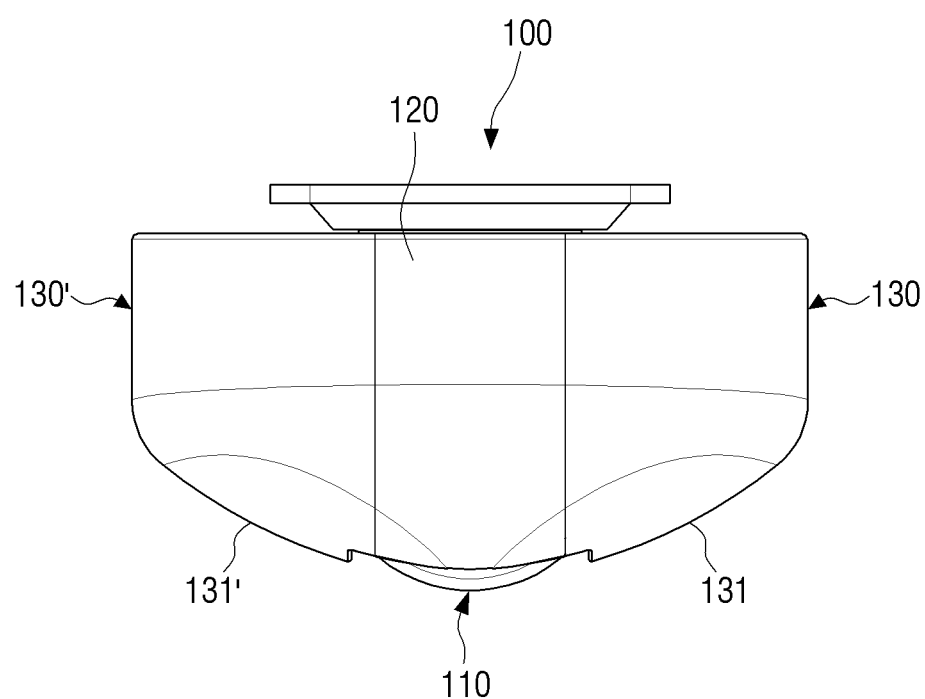
FIG. 17 is a side view of the caster device according to an embodiment.

FIG. 17 is a side view illustrating the caster device 100 according to an embodiment. Here, the same reference numbers are used for the same configuration, and a duplicate description thereof will be omitted.

For example, since the housing 120 and the elastic member 130 are the same as described above, a duplicate description thereof will be omitted.

The caster device 100 may include an additional elastic member 130' including an inclined surface 131' inclining from above of the horizontal rotation axis H1 toward the bottom of the case.

Here, the additional elastic member 130' may be disposed symmetrically with respect to the elastic member 130 with respect to the housing 120. In addition, the additional elastic member 130' may be made of the same material as the above-described elastic member 130.

In addition, the inclined surface 131' of the additional elastic member 130' may be formed to be inclined in a direction toward the lower surface 111 of the caster wheel 110. That is, the inclined surface 131 of the elastic member 130 and the inclined surface 131' of the additional elastic member 130' are symmetrically disposed with respect to the housing 120 and may be inclined in a direction toward each other.

For example, the additional elastic member 130' is disposed on the rear surface of the housing 120, and thus the obstacle O moves along the inclined surface 131' even while the caster device 100 descends along the obstacle O, thereby greatly reducing the shaking due to the shock of the robot 1.

In an exemplary embodiment, the case 160 may include a plurality of elastic members 130, 130' disposed on opposing outer side surfaces 170 of the case 160 with respect to the caster wheel 110. Each of the plurality of elastic members has an inclined surface inclining outward from the bottom of the case toward the extended plane H3 which intersects both outer side surfaces 170 of the case.

Accordingly, when the robot 1 descends the obstacle O through the additional elastic member 130' as well as when the robot 1 climbs the obstacle O through the elastic member 130, the caster device 100 minimizes the shaking, thereby reducing the shaking of the center of gravity G of the robot 1 to realize the stable driving of the robot 1.

Although certain embodiments have been individually described hereinabove, the respective embodiments may also be implemented so that configurations and operations thereof are combined with those of one or more of other embodiments.

While embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A caster device, comprising:
a caster wheel configured to rotate around a horizontal rotation axis; and
a case configured to expose a lower surface of the caster wheel and cover the caster wheel, the case having an inclined surface that extends from a level corresponding a horizontal plane that includes the horizontal rotation axis to a level corresponding to a bottom of the case
wherein the case comprises:
a housing;
an elastic member that is disposed on a first side of the housing and has the inclined surface; and
a shock absorbing member that is disposed between the housing and the elastic member.

2. The caster device as claimed in claim 1, wherein the inclined surface has a curvature greater than a curvature of the caster wheel.

3. The caster device as claimed in claim 1, wherein the inclined surface is spaced apart from a vertical plane that includes the horizontal rotation axis.

4. The caster device as claimed in claim 1, wherein the elastic member is made of at least one of elastomer, synthetic rubber, or natural rubber.

5. The caster device as claimed in claim 1, wherein the shock absorbing member comprises an elastic material comprising at least one of elastomer, urethane foam, or latex.

6. The caster device as claimed in claim 1, wherein the shock absorbing member comprises a spring that has one end connected to the housing and other end connected to the elastic member.

7. The caster device as claimed in claim 1, wherein the case includes an additional elastic member that is disposed on the other surface facing the a second side of the housing opposite the first side, and has an inclined surface that extends from the level corresponding the horizontal plane to the level corresponding to the bottom of the case.

8. A robot, comprising:
a main body;
a driving wheel that is disposed at a lower portion of the main body and moves the main body; and
a caster device that is disposed at the lower portion of the main body and is disposed at at least one of one side or the other side of the driving wheel,
wherein the caster device comprises:
a caster wheel configured to rotate around a horizontal rotation axis; and
a case configured to expose a lower surface of the caster wheel and cover the caster wheel, the case having an inclined surface that extends from a level corresponding a horizontal plane that includes the horizontal rotation axis to a level corresponding to a bottom of the case, and wherein the case comprises:
a housing;
an elastic member that is disposed on a side of the housing and forms the inclined surface; and
a shock absorbing member that is disposed between the housing and the elastic member.

9. The robot as claimed in claim 8, further comprising:
a suspension that is disposed between the main body and the caster device and is configured to adjust a height of the caster device.

10. The robot as claimed in claim 8, wherein a first distance from a lower surface of the main body to a center of gravity of the main body is greater than a second distance from the lower surface of the main body to the horizontal rotation axis of the caster wheel.

11. The robot as claimed in claim 8, further comprising:
at least one of a positioning sensor, an inertial measurement unit sensor, or an inclination sensor.

* * * * *